June 22, 1965

R. D. RUMSEY 3,190,313

VALVE CONSTRUCTION

Filed June 18, 1962

INVENTOR.
ROLLIN DOUGLAS RUMSEY
BY
ATTORNEYS

June 22, 1965    R. D. RUMSEY    3,190,313
VALVE CONSTRUCTION
Filed June 18, 1962    5 Sheets-Sheet 2
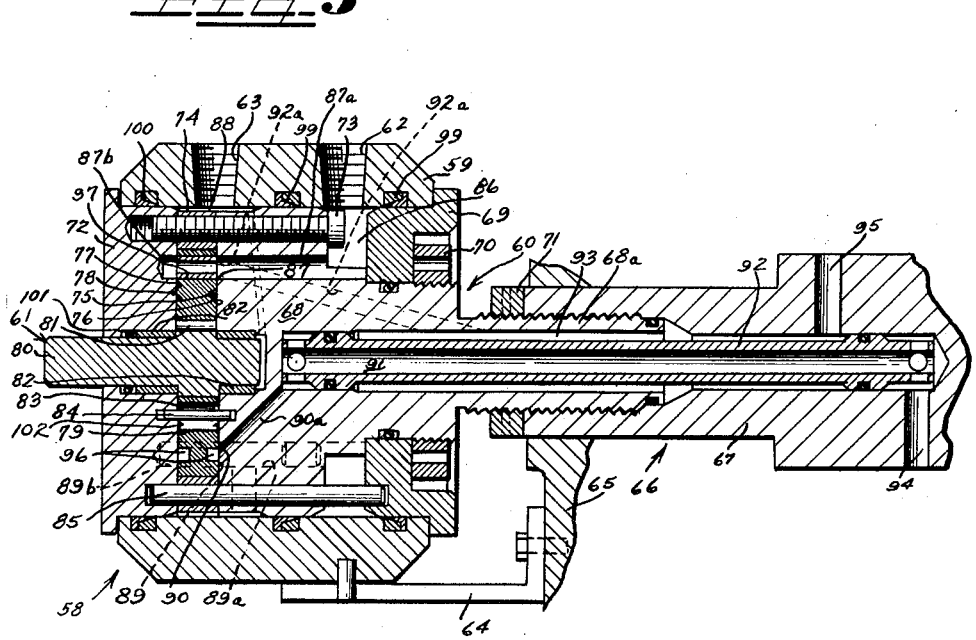
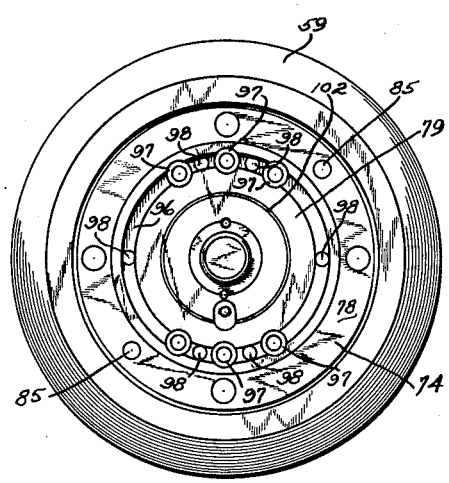 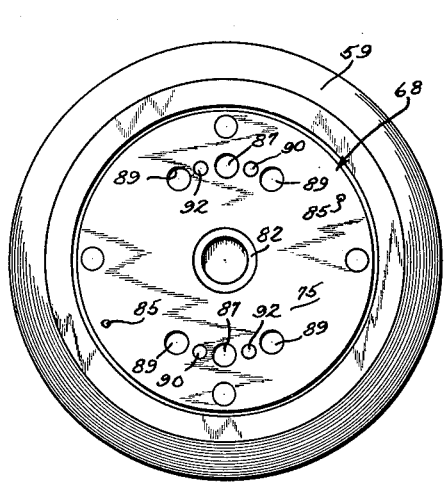
INVENTOR.
ROLLIN DOUGLAS RUMSEY
BY
ATTORNEYS

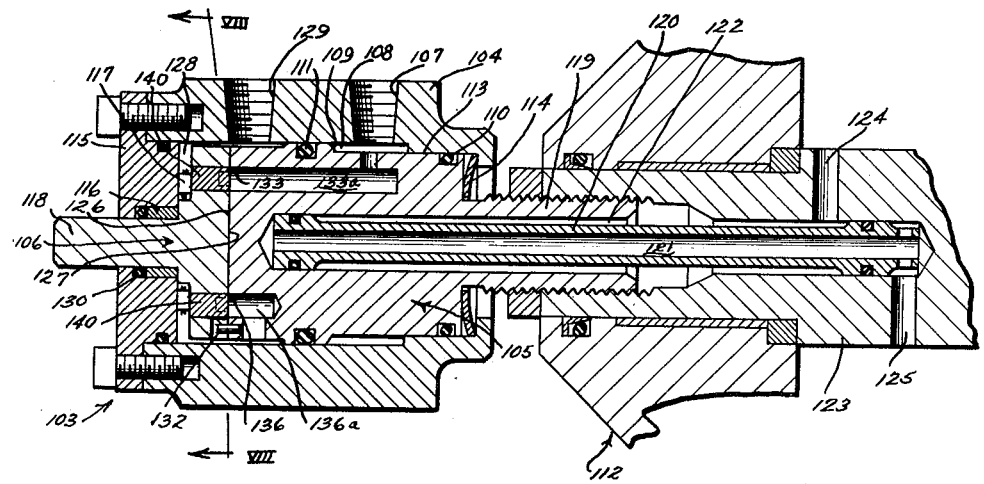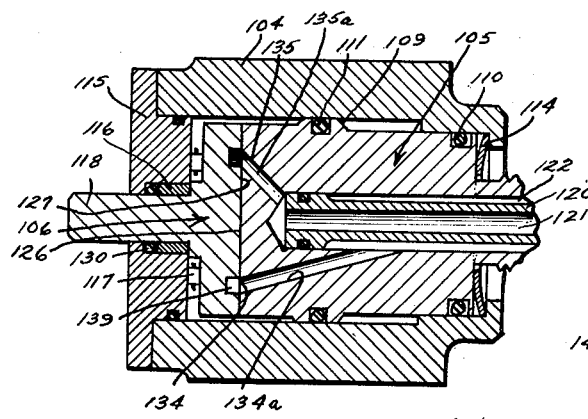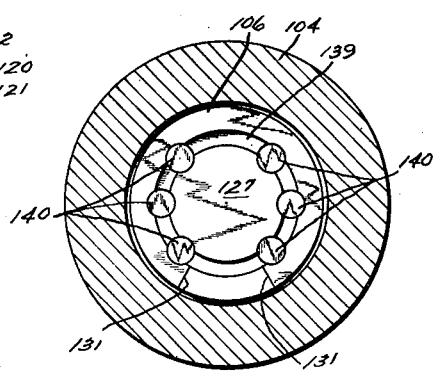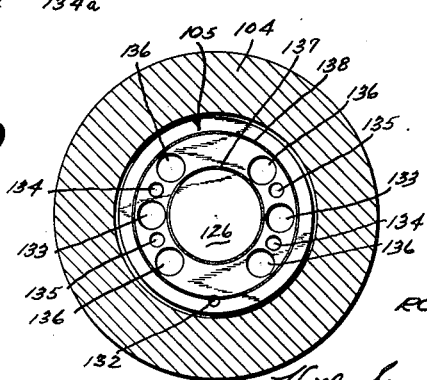

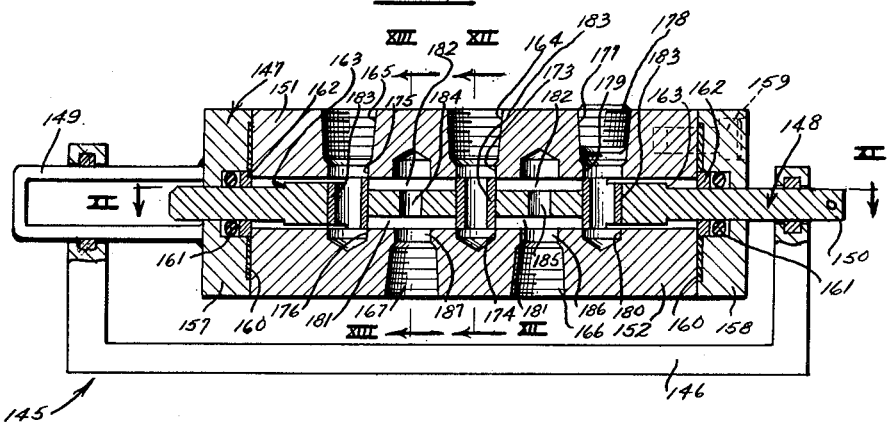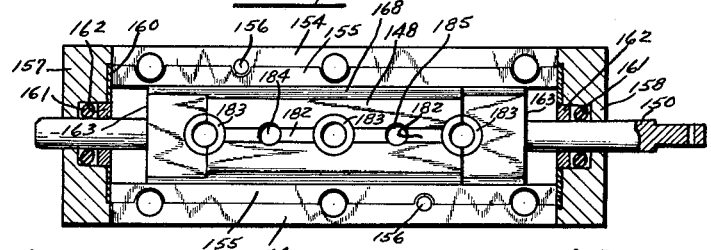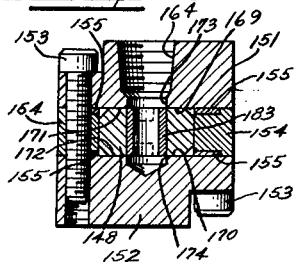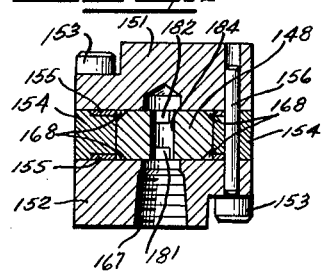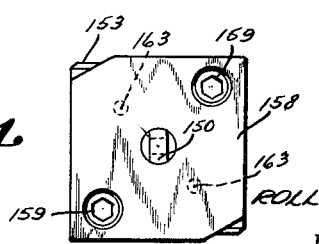

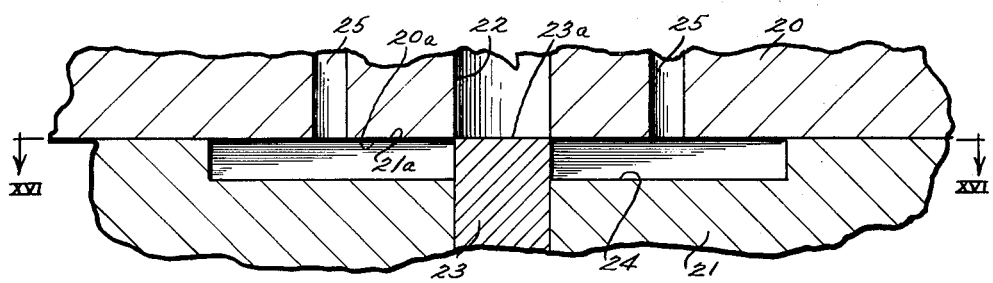
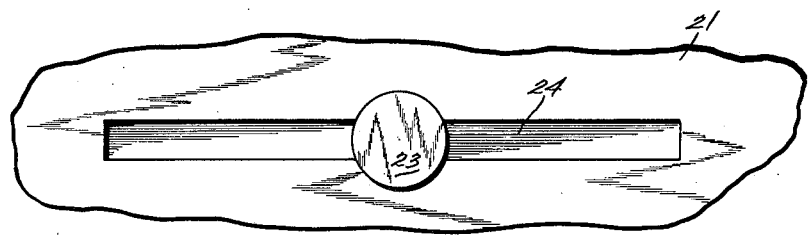
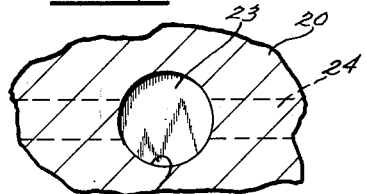
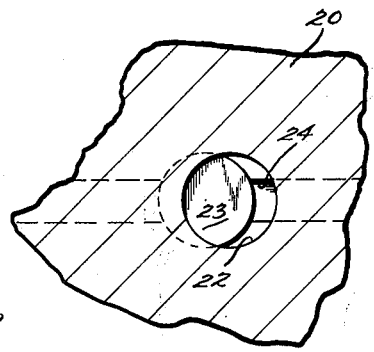
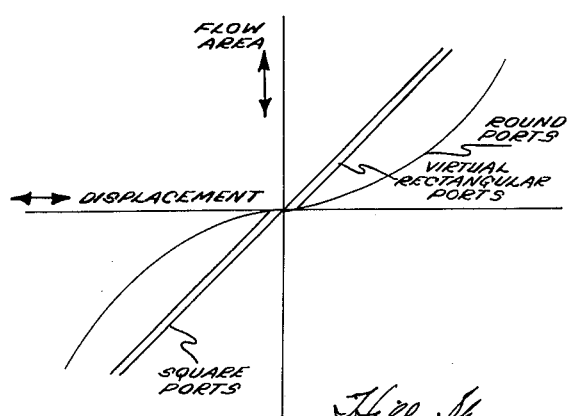

A United States Patent Office 3,190,313
Patented June 22, 1965

3,190,313
VALVE CONSTRUCTION
Rollin Douglas Rumsey, Buffalo, N.Y., assignor to Houdaille Industries, Inc., Buffalo, N.Y., a corporation of Michigan
Filed June 18, 1962, Ser. No. 203,109
9 Claims. (Cl. 137—625.22)

This invention relates generally to fluid valve structure, and more specifically to an improved internal construction and its method of manufacture incorporated therein.

Although the principles of the present invention may be included in various valves or valve devices, a particularly useful application is made in a servo valve which is to be proportionately positioned to provide a proportionate control of the fluid-device or system to which it is connected.

The present invention contemplates the utilization of a round internal porting hole which is alignable with a round plug for closing a porting hole, the members having these features being relatively displaceable. Extending from the outer periphery of the plug is a groove which, as is known in the art, is narrower than the diameter of such hole and plug, so that an edge of the plug, an edge of the hole, and opposite edges of the groove jointly coact to define a flow area which is virtually rectangular in that the effective flow area thus defined is proportional to the relative displacement between the valve members from an aligned neutral position thereof. I have also provided a method by which such structure may be constructed.

Accordingly, it is an object of the present invention to provide an improved valve device.

Another object of the present invention is to provide a valve in which a rectangular or square port operating characteristic can be advantageously included by use of round internal porting.

Yet another object of the present invention is to provide a method by which a valve may be constructed.

A still further object of the present invention is to provide a variety of different valve configurations in which there can be provided internal valve porting which functionally is rectangular.

Many other advantages, features and additional objects of the present invention will become manifest to those versed in the art upon making reference to the detailed description and the accompanying sheets of drawings in which a number of structural embodiments incorporates the principles of the present invention by way of illustrative example.

On the drawings:

FIGURE 3 is a cross-sectional view taken in an irregular line through a further servo valve assembly equipped with internal porting provided in accordance with the principles of the present invention;

FIGURE 4 is an end elevational view of the structure of FIGURE 3 with an end cap member 72 removed;

FIGURE 5 is an end elevational view of the structure of FIGURE 3 with the end cap member 72 and a rotor assembly 61 thereof removed;

FIGURE 6 is a cross-sectional view of a still further rotary servo valve assembly equipped with internal porting provided in accordance with the principles of the present invention;

FIGURE 7 is a cross-sectional view of the servo valve assembly of FIGURE 6, taken along a different radial section;

FIGURE 8 is a cross-sectional view taken along line VIII—VIII of FIGURE 6;

FIGURE 9 is a cross-sectional view taken along line VIII—VIII of FIGURE 6, but viewed in the opposite axial direction;

FIGURE 10 is a cross-sectional view of a still further servo valve assembly equipped with internal porting provided in accordance with the principles of the present invention;

FIGURE 11 is a cross-sectional view taken along line XI—XI of FIGURE 10;

FIGURE 12 is a cross-sectional view taken along line XII—XII of FIGURE 10;

FIGURE 13 is a cross-sectional view taken along line XIII—XIII of FIGURE 10;

FIGURE 14 is an elevational view of the right end of the structure of FIGURE 10 as shown, with certain parts omitted;

FIGURE 15 is a fragmentary cross-sectional view of typical internal porting structure provided in accordance with the principles of the present invention;

FIGURE 16 is a view taken along line XVI—XVI of FIGURE 15;

FIGURE 17 is a fragmentary top view of the structure of FIGURE 15;

FIGURE 18 is a view of the structure of FIGURE 17 with valve elements thereof relatively displaced; and FIGURE 19 is a graph which comparatively illustrates the performance of different types of valve porting structure.

As shown on the drawings:

Figure 1:
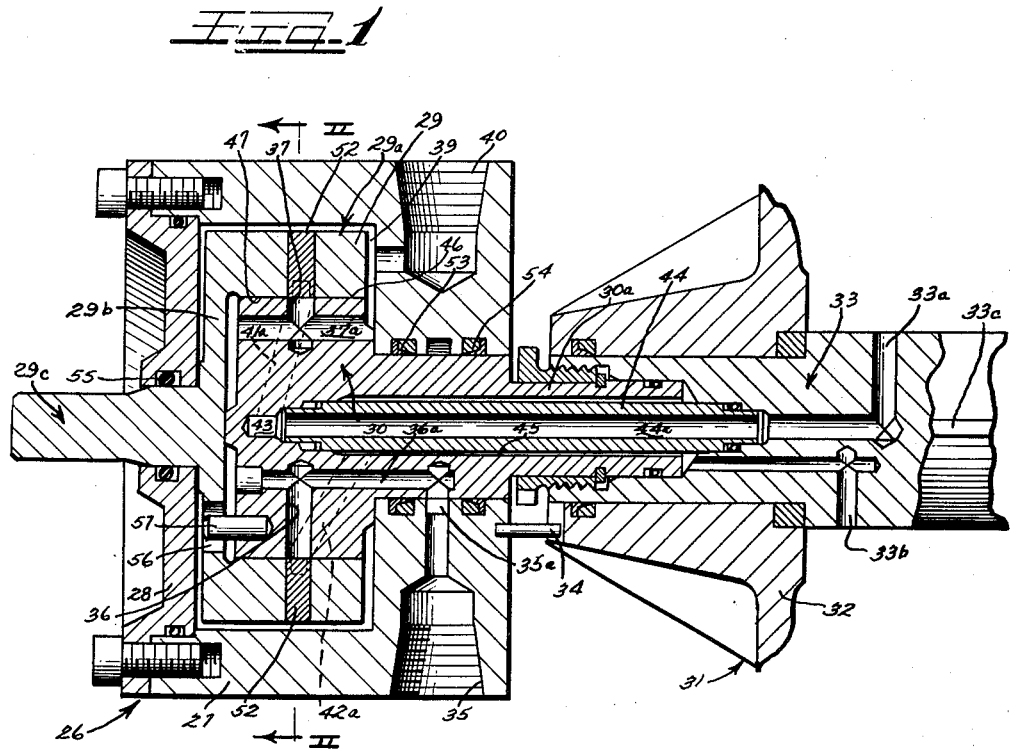
FIGURE 1 is a cross-sectional view of a rotary servo valve assembly equipped with internal porting provided in accordance with the principles of the present invention, and taken along line I—I of FIGURE 2.

The principles of this invention may best be understood by a reference to FIGURES 15–18 wherein there is illustrated a pair of valve members 20 and 21. For purposes of further identification and comparison, the valve element 20 may be referred to as a spool, while the element 21 may be referred to as a rotor, which may be of the linear type. Although the term "spool" is employed, it is to be understood that no spool valve is disclosed herein, as that type of device is ordinarily known. The spool 20 includes means 22 which defines a round opening which here comprises a round porting hole. The element 21 includes a round or circular cylindrical plug 23 which has an end 23a which is coplanar or flush with mating sealing surfaces 20a, 21a on the valve elements 20 and 21. The plug 23 has a diameter which corresponds to the diameter of the porting hole 22. When these diameters are absolutely identical, then the peripheral edge of the plug 23 coincides with the edge of the porting hole 22 to block the same. This type of construction may be referred to as "zero-lap" construction. If the plug 23 be made slightly larger than the porting hole 22, it would overlap the same slightly to produce a valve device having a functional overlap or deadspot. If the porting hole 22 were made slightly larger than the plug 23, the resulting device would functionally be slightly underlapped. Extending from the plug 23 in the valve element or rotor 21, there are means which define a groove 24, the groove 24 extending in opposite directions from the plug 23, the direction of its extent being the direction of the relative movement between the valve elements 20 and 21. The groove 24 extends up to the plug 23 which intersects and blocks the groove 24, the groove 24 being centered and being narrower, such as half the width, of the plug 23. Thus, each segment of the groove can communicate with the porting hole 22 when the plug 23 is shifted laterally, respectively, the groove 24 further communicating with an additional opening 25, there being one such additional opening on each side of the plug 23 where desired. The porting hole 22 may be termed an inlet, and the porting openings 25 may be termed as outlets, or vice versa.

When fluid is admitted under pressure into the hole 22, no or substantially no fluid will flow therefrom into the groove 24 when the plug 23 is aligned concentrically therewith as shown in FIGURE 15, such alignment constituting therefore a neutral position. When the members 20 and 21 are relatively displaced in the direction of the groove 24, a flow area of restricted size is created such as shown in FIGURE 18 wherein one edge of the plug 23, one edge of the means defining the porting hole 22, and the opposite edges which define the groove 24 jointly define a virtually rectangular port or flow area. It is evident that if the amount of movement is shifted to be either increased or decreased, a greater amount of the groove 24 will be opened, and that the area of the flow opening will increase linearly with such displacement.

If a square or rectangular hole were uncovered as a flow area, its effective area would be proportionate to the extent to which it was uncovered. Such performance is illustrated by the straight line in FIGURE 19 identified as "square ports." If similar structure were employed but using a round port which was gradually uncovered, either by a curved edge or by a straight edge, a curve of flow capacity would be produced similar to that indicated in FIGURE 19 by the term "round ports." Although the manufacturing advantages of providing round element construction have been retained in the structure of FIGURES 15-18, this structure as it is progressively uncovered as shown in FIGURE 18 produces a performance curve such as shown in FIGURE 19 and identified by the term "virtual rectangular ports." Except for a negligible amount near the neutral position, this structure behaves and performs as if it constituted a truly square or rectangular port being progressively uncovered. Such performance is particularly advantageous in servo valves, a number of which, incorporating the foregoing principles of the present invention, are described in the paragraphs which follow.

The principles of this invention are thus particularly useful when embodied in a rotary servo valve assembly such as is illustrated in FIGURE 1, generally indicated by the numeral 26. The servo valve assembly 26 includes a stationary housing 27 having an annular end cap 28 which forms a part thereof, and in which there is disposed a pair of relatively rotatable valve members or elements 29, 30. The valve element 29 may be termed a control valve member or rotor which includes a tubular portion 29a supported by a disk portion 29b having an externally accessible portion 29c which comprises an axial extension thereof. The valve member 30 may be termed a spool and here comprises a follow-up valve member concentric with the rotor member 29 and having an axial extension 30a which is telescopically mechanically and fluidly connectable to a rotary actuator generally indicated at 31.

The rotary actuator 31 is known and is therefore only fragmentarily illustrated. It includes a stationary housing 32 which rotatably supports a shaft 33 which is provided with a fluid passage 33a and a further fluid passage 33b which respectively communicate with separate chambers on opposite sides of a wing shaft or vane 33c carried by the shaft 33.

Where it is desired to keep the housing 27 from rotating, means connecting the housing 27 to the actuator housing 32 may be employed, such means here comprising a pin 34 extending from one of such housings into the other.

Figure 2:
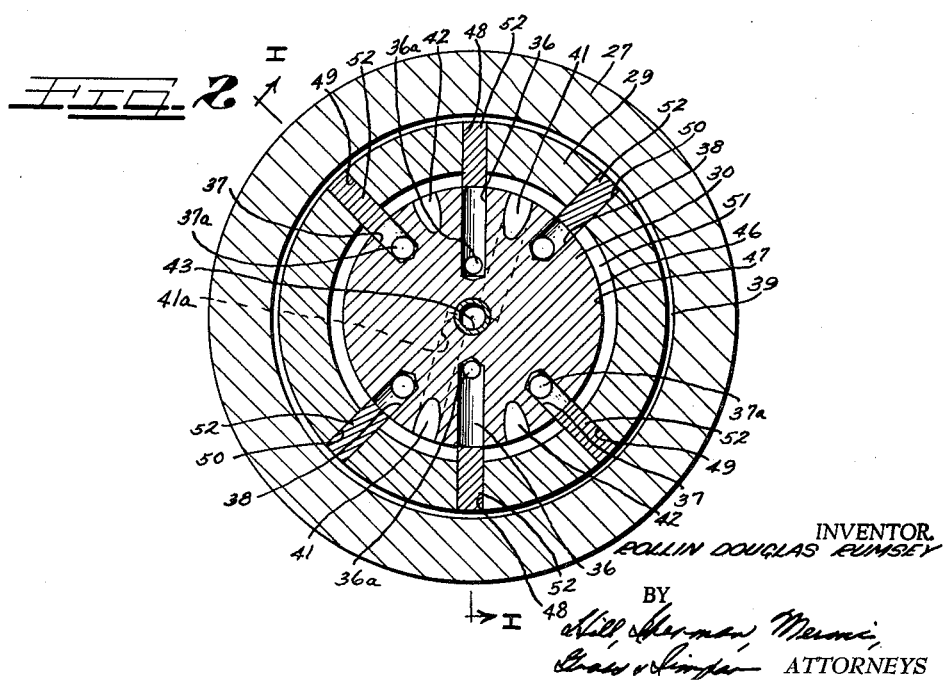
FIGURE 2 is a cross-sectional view taken along line II—II of FIGURE 1.

The housing 27 is further provided with an inlet or inlet port 35 which communicates with an annular channel 35a shown in FIGURE 1. The spool 30 is provided with means which defines a number of round or circular openings, ports, or porting holes 36, 37, 38. The porting hole 36 communicates through a bore 36a with the channel 35a and thus may be termed an inlet porting hole. Diametrically opposite thereto there is a second inlet porting hole 36 which also communicates with the inlet 35 in the same manner. One of these porting holes 36 is omitted from FIGURE 1 for clarity, but both are shown in FIGURE 2. The porting hole 37 communicates via a bore 37a with a peripheral passage 39 leading to a return or return port 40. Diametrically opposite to the porting hole 37, there is a second porting hole 37 shown in FIGURE 2 which similarly communicates with the return port 40. The porting hole 38, together with a further porting hole 38 diametrically opposite thereto, are disposed on the opposite sides of the respective porting holes 36 from the porting hole 37, and the porting holes 38, like the porting holes 37, communicate with the passage 39, and hence to the return port 40. Thus the porting holes 37 and 38 closely flank the porting hole 36. Between the porting hole 36 and the adjacent porting hole 37 or 38 there is a pair of other porting holes 41, 42 of any configuration which are thus flanked by the round porting holes 37, 38. A further or other bore 41a communicates the porting hole 41 with an axial passage 43 in the spool 30 which opens into the end of a tubular member 44 received in the extension 30a for conducting fluid through a passage 44a therethrough leading to the fluid passage 33a and the actuator shaft 33. A second such porting hole 41 is provided diametrically opposite thereto as shown in FIGURE 2 but omitted from FIGURE 1. The porting hole 42 communicates by a further or other bore 42a with an annular passage 45 defined by the outer periphery of the tubular member 44 and the inner bore of the tubular extension 30a. The annular passage 45 communicates with the fluid passage 33b of the actuator shaft 33. As seen in FIGURE 2, a further opening 42 is provided diametrically opposite thereto. Thus the other openings 41, 42 communicate with the concentric passages 44a, 45.

The axes of the round porting holes 36-38 extend radially, and lie in one plane perpendicular to the rotational axis of the spool 30. The outer periphery of the spool 30 comprises a mating surface or sealing surface 46 which slidably and sealably engages a confronting inner sealing or mating surface 47 on the rotor member 29.

The rotor member 29 is provided with a number of plugged radial openings 48-50 which intersect the mating surface 47 and which are alignable concentrically with the openings 36-38 simultaneously. During manufacture, the plugged openings 48-50 comprise round openings identical to the openings 36-38 (subject to a possible slight enlargement described later herein). Centered on the plane in which the porting holes 36-38 and plugged holes 48-50 lie is a groove 51 here shown to be continuous and opening into the mating surface 47. The groove width is less than the width or diameter of the porting holes 36-38 and 48-50, such as one-half the width. The groove 51 extends in the direction of relative movability between the rotor member 29 and the spool 30 and thus intersects all the openings in both of the adjacent mating surfaces 46, 47. Within each of the plugged openings 48-50 there is a circular or round cylindrical plug 52 which has an inner end coplanar or flush with the mating surfaces 46, 47, the plugs 52 being rigidly retained within their respective openings and having a diameter at the mating surfaces which corresponds to the diameter of the opposite opening. The term "corresponds" is intended to encompass a diameter which is slightly greater and slightly smaller than the opposite opening, for purposes explained below. The plugs 52 preferably are hardened, and being wider than the groove 51, severally block the groove 51 to form various increments thereof, several of which communicate with the other openings 41, 42, when the plugs are concentric with the inlet and return porting holes 36-38.

It will be noted that the angular distance between the axis of the inlet porting holes 36 and the actuator or other ports 41, 42 is relatively small, being somewhat less than 45°. This low angle minimizes the possible area of leakage at the mating surfaces 46, 47. Any leakage from the higher pressure porting holes therein will pass to the periphery of the mating surfaces 46, 47 which communicate by the continually open passage 39 to the return port 40.

When fluid pressure is admitted through the inlet port 35 in the housing 27, it passes by the annular channel 35a to the bores 36a to the inlet ports 36 in the spool 30. Fluid flow is blocked by the position of the rotor 29 when it is positioned in a neutral position, which is that drawn, wherein the plugs 52 are each in concentric blocking alignment with the corresponding round porting hole in the spool 30. When a control input torque is applied to the portion 29c of the rotor, the plugs are displaced angularly in one direction, thereby partially uncovering the inlet porting holes 36, enabling fluid to flow into the adjacent groove segment and through one of the additional holes 41, 42 through one of the concentric passages 44a, 45 to the actuator 31. Fluid is thus driven out of the actuator through the other of the concentric passages 44a, 45, through the other of the openings 41, 42, and through an uncovered communicating porting hole 37 or 38 for return through the passage 39 to the return port 40.

The volumetric change within the actuator of the chamber being filled and the associated decrease of volume of the other chamber in the actuator is accompanied by a rotation of the shaft 33 which provides a follow-up torque applied to the extension 30a which repositions the spool 30 in that angular direction required to reclose the previously uncovered porting holes 36–38.

If the spool 30 be locked or blocked, the device will not function as a rotary servo valve but will nevertheless constitute an advantageous valve structure of the four-way type.

When high pressure fluid is admitted to the inlet port 35 and the channel 35a there is a tendency for it to leak out axially along the spool extension 30a. Such leakage is blocked by a pair of spaced seals 53, 54 which are subject to the higher inlet pressure. Since they are subject to the higher pressure, more torque is required to turn them which is provided by the actuator. The fluid pressure at the return port 40 and the passage 39 is relatively lower, which fluid pressure is present at a fluid seal 55 supported by the housing 27. Since a relatively low pressure, namely the return pressure, is applied thereto, relatively little frictional drag will be applied to the rotor portion 29c through which input torque is applied. Whenever either the rotor 29 or the spool 30 is relatively displaced from the other thereof, there is provided at each of the round porting holes 36–38 a virtually rectangular port opening which is defined by an edge of the hardened plug 52, an edge of the associated porting holes 36–38, and the edges or walls that define the width of the groove 51.

To limit the relative displacement between the rotor 29 and the spool 30, means are provided acting therebetween which precludes any type of alignment other than that intended and described above. To that end, the disk portion 29b of the rotor 29 is provided with a pair of opposite abutments defined by an aperture 56 which is internally engageable by a pair of abutments defined by the outside diameter of a stop pin 57 securely carried by the spool 30.

As is explained more fully below, the plugged holes 48–50 are of the same size as the porting holes 36–38. Hence the plugs 52 are also of the same size. The slightest movement between the rotor and the spool thus initiates a fluid flow through the valve device 26. To make the device 26 slightly less sensitive the plugged openings 48–50 and the plugs 52 may be made ever so slightly larger so that they slightly overlap the diameter of the round porting holes 36–38. Such a valve would have slight overlap as distinguished from one with "zero-lap" wherein the diameters are identical. To provide higher sensitivity, slight underlap may be employed, which may be effected by making the porting holes 36–38 slightly larger than the coacting end of the respective plugs 52.

The inlet port 35 is primarily so designated as a term of reference wherein one of the fluid passages 33a, 33b alternately serve as outlets. These terms are to be understood as terms of reference and not of limitation.

To fabricate the device of FIGURE 1, the rotor and spool are assembled as a unit, and the various concentric pairs of round porting holes are then provided simultaneously in both parts. Thus the circular port hole is formed to extend through the rotor and into the spool. Thereafter or therebefore, the groove 51 is machined and then the plugs 52 are inserted. After their insertion, an end thereof is finished to make it flush with the sealing face 47. For maximum erosion-free life, the plugs 52 are hardened before insertion and the spool 30 is hardened after it has been drilled. If either overlap or underlap is desired, the proper circular port hole is slightly enlarged in only one of the elements 29, 30.

Depending upon various factors, the foregoing mode of manufacture may encounter two problems. The first of these is that the drilling of the hole from the one member into the other may cause a slight burr to form, thereby making disassembly thereof difficult. The second problem is that upon rechucking the rotor, it may not be held in precisely the same manner for grinding the inner ends of the plugs 52. These problems, if present, can be overcome by providing the groove 51 and the later-plugged holes 48–50 in the rotor 29. If hardening is desired, such should be done at this time after which the sealing face of the rotor 29 is finished to a slightly undersized diameter tightly receptive of the inner element or spool 30. Then the elements 29 and 30 are assembled and the port holes 48–50 are used as guides for forming the holes 36–38 concentric therewith in the inner element. Thereafter the elements may be disassembled and the plugs inserted into the openings 48–50 and ground to be coplanar with the sealing face 47. This grinding brings the sealing face to the desired finished diameter.

In FIGURES 3–5 there is shown a further valve structure which comprises a rotary servo valve 58 illustrated in FIGURE 3 in its neutral position. The valve structure 58 includes a stationary housing 59, a spool assembly 60, and a rotor assembly 61. The housing 59 is provided with an inlet or inlet port 62 and a return or return port 63. If desired, the housing 59 may be secured by a bracket structure 64 to a housing 65 of an actuator generally and fragmentarily indicated at 66 which includes a shaft 67. The spool assembly 60 includes a spool body 68 to which an end plug 69 is secured as by a nut 70. The spool assembly 60 includes a spool body extension 68a which is threaded into the shaft 67 and corotatably secured thereto as by a nut 71. The actuator 66 is otherwise functionally similar to that described in association with the valve device of FIGURE 1.

The spool assembly 60 further includes an end cap member 72 supported by the housing 59 and secured as by a number of screws 73 to the spool body 68 and spaced therefrom by a spacer 74 of annular configuration through which the screws 73 extend. The spool body 68 has an end face 75 which is a sealing or mating face which seals and mates with an end face 76 on the rotor assembly 61, while the end cap member 72 has a sealing or mating face 77 which slidably engages an adjacent sealing and mating surface 78 on the rotor assembly 61.

The rotor assembly 61 includes a disk portion 79 and an externally accessible portion or extension 80 which is pinned corotatably to the disk portion 79 by a pair of roll pins 81. A pair of sleeve bearings 82, 82 carried by the spool assembly 60 rotatably support the rotor assembly 61 therein. The rotor has means which defines oppositely directed abutments, here comprising an aperture 83 within which there is disposed stop means, here comprising a stop pin 84 carried by the spool assembly 60 for limiting the relative angular movement between the spool assembly 60 and the rotor assembly 61. A further pair of pins 85, 85 or pin means are angularly located as shown in FIGURE 4 and join the end cap member 72, the spacer 74, the spool body 68, and the end cap member 69 together in a manner (as shown in FIGURE 3 for reasons of clarity in a slightly lowered position) that precludes relative angular movement, but which enables movement thereof within the housing 59. Thus the surfaces 75 and 77 are parallel and confronting and sealingly mate with the parallel spaced surfaces 76, 78. The thickness of the disk portion 79 is ever so slightly less than the thickness of the spacer 74 so that the rotor member 61 may turn or move relatively thereto freely in a sealed relation.

High pressure fluid is admitted through the inlet 62 and leads to an annular passage 86 which communicates through a pair of bores with a pair of openings 87 which are diametrically opposite each other and which comprise circular or round porting holes, openings, or ports which intersect the mating surface 75. The return port 63 communicates with an annular passage 88 which communicates with a number of plugged bores which terminate in four return openings 89 which intersect the mating surface 75. The openings 89 comprise circular or round porting holes or ports. A further port or actuator opening 90 intersects the mating face 75 between the inlet port 87 and one of the adjacent return ports 89, there being two such actuator ports 90, both of which communicate with a central bore 91 within a tubular member 92 disposed within the spool body extension 68a. A further pair of actuator ports 92 are disposed diametrically opposite from each other between the inlet porting hole 87 and the other adjacent return port 89 and communicate with an annular passage 93 defined between the outer surface of the tubular member 92 and the inner surface of the spool body extensions 68a. The concentric passages 91 and 93 respectively communicate with fluid passages 94, 95 in the actuator 66, and the threaded extension portion 68a and the tubular member 92 are telescopically connectable with the actuator 66 through its shaft 67. One of the passages that communicates the openings 90 is illustrated at 90a, FIGURE 1, and one of the passages that communicates the openings 92 is there identified as 92a. Similarly, the bore from the illustrated porting hole 87 is identified as 87a and the bore from the illustrated return port is identified as 89a. Each of the bores 89a and 87a extend or are projected into the end cap 72 for a short distance so that they comprise further opposite ports which extend to or intersect the mating surface 77, such ports being herein referred to as opposite blind ports 89b and 87b. The round porting holes 87 and 89 have axes which are disposed a uniform distance from the rotational axis and which lie parallel to each other in a circular arrangement wherein the angle between the fluid inlet porting hole 87 and the adjacent fluid actuator port 92 or 90 is relatively small, being somewhat less than 45° and thus defining a minimum length leakage path.

The rotor assembly 61 comprises a control valve member or follow-up member which is provided with a pair of oppositely directed groves 96, 96 which open into the mating surfaces 76, 78 centered on the axes of the fluid inlet porting holes 87 and fluid return porting holes 89 and being of a width somewhat less than, such as half, the diameter of such porting holes. The grooves 96 are intersected by means which initially defines round openings concentric with the porting holes 87 and 89, and substantially of the same size, which therefore are somewhat wider than the grooves 96. Within each such opening, there is disposed a round cylindrical tubular plug or sleeve 97, each of which has opposite ends which are coplanar or flush with the mating surfaces 76, 78. The plug diameters may be identical to the diameter of the associated porting hole, or may be slightly larger than such porting hole, or such porting hole may be slightly larger than such plug 97 as already described, such relationships being herein collectively referred to as being of corresponding diameter. The plugs 97 preferably are hardened to prevent edge errosion at the grooves 96, and the plugs 97 block each of the grooves 96 to define increments thereof which communicate with the actuator ports 90 and 92. Each of the plugs 97 is of uniform diameter and comprises a sleeve or is tubular. By this construction, the fluid pressure in the bores 87a and 89a is directly communicated through the plug to the associated blind port 87b, 89b so that such pressures are balanced on the disk 79. The rotor disk 79 is also provided with means for communicating the opposite groove segments, here comprising an opening 98 between each pair of plugs 97. Since the grooves 96 extend in the direction of relative movability of the valve members, the groove segments are readily adapted to connect appropriate adjacent pairs of openings in the spool body. The plugs 97 normally block all the porting holes 87, 89 when the rotor assembly 61 is in a neutral position, but when the rotor is displaced angularly therefrom, the groove segments connect the fluid inlet porting hole 87 with one of the adjacent actuator ports 90 and 92 which flank it, and connect the other of the actuator ports 90 and 92 with the adjacent one of the return porting holes 89 that flank the actuator ports 90, 92. Whenever the rotor assembly 61 is angularly displaced from the neutral position or porting hole blocking position, an edge of one of the plugs 97, an edge of the associated porting hole 87 or 89, and the walls of the groove 96 define a virtually rectangular flow area, the size of which varies linearly for substantially the entire adjustment or positioning range.

The higher pressure at the fluid inlet 62 is retained in the annular channel 86 by a pair of high pressure dynamic seals 99, 99, and the follow-up torque applied by the actuator shaft 67 to the spool assembly 60 is available for overcoming the friction at such dynamic seals. A further dynamic seal 100, in cooperation with the adjacent seal 99, retains the return pressure in the annular passage 88, its friction likewise being overcome by the follow-up torque. A still further low pressure dynamic seal 101 acts on the rotor portion 80, and any input torque applied thereto readily overcomes the friction of such seal 101. The various peripheries of the mating surfaces 75-78 communicate by passages which are continually open with the annular passage 88. To this end, any radially inwardly directed leakage from the higher pressure inlet port 87 will be trapped by one of two oppositely directed inter-communicating drainage grooves 102 on the mating surfaces 76, 78, and be conducted through the aperture 83 to the opposite drainage groove 102 where the force is thereby balanced. Any inwardly radially directed leakage from there will pass along the inner bearing 82 which is vented at its inner end to the passage 88.

To machine the various porting holes in the spool and rotor, either before or after the grooves 96 are machined, and with the spool body 68, spacer 74, end cap 72, and rotor assembly 61 assembled as a unit, the bores 89a and 87a are formed extending through the rotor disk 79 and including the blind port ends in the end cap 72. Thereafter the elements are disassembled and the plugs 97 are rigidly inserted into the openings in the disk 79, the ends of the plugs 97 being thereafter ground to be flush or coplanar with the adjacent sealing face of the disk 79. At this operation, the thickness of the disk 79 is properly established so that tightening of the screws 73 does not produce a material drag on the rotor assembly 61. Appropriate openings may be enlarged for producing slight overlap or underlap as described before, and the spool body 68 is preferably hardened after it has been machined so that it too, like the hardened plugs 97, will resist fluid erosion.

In this embodiment, the fluid pressure present at any point on the rotor assembly 61 is balanced by the presence of a similar fluid pressure at an opposite portion thereof so that the rotor member is fluidly in balance all the time.

In FIGURES 6–9 there is illustrated a further embodiment generally similar to that of FIGURES 3–5, but wherein the rotor assembly is unbalanced fluidly. The valve structure of FIGURES 6–9 also comprises a rotary servo valve generally indicated at 103 and shown in its neutral position. The valve structure 103 includes a stationary housing 104, a spool 105, and a rotor 106. The housing 104 is provided with an inlet or inlet port 107 which communicates with an annular channel 108, one end of which is defined by an annular peripheral piston surface 109 on the spool 105 by which an axial fluid bias is applied which urges the spool 105 against the rotor 106. The annular channel 108 is sealed by a pair of high pressure dynamic seals 110, 111, the rotary friction of which is overcome by follow-up torque applied to the spool 105 by an actuator generally indicated at 112. The spool 105 is rotatably supported within the housing 104 by the piston portion 109 and a smaller diameter portion 113, and is further biased in an axial direction by an annular spring 114. The housing 104 includes an end cap 115 secured thereto which rotatably, through a bearing 116, supports the rotor 106 for relative movement with respect to the spool 105. A set of needle bearings 117 reacts against the fluid pressure applied to the piston surface 109 and the spring pressure applied by the spring 114, the same extending about the axis of the rotor 106. The rotor 106 includes an externally accessible portion 118 which comprises an extension accessible from one axial end, while the spool 105 includes an extension 119 within which there is disposed a tubular member 120 which coacts therewith to define a pair of concentric actuator fluid passages 121 and 122. The extension 119 of the spool 105 is threadably telescopically receivable in a shaft 123 of the actuator 112 and the concentric fluid passages 121, 122 therein communicate with a pair of fluid passages 124, 125 leading to opposite chambers in the actuator 112.

The spool 105 has a mating surface 126 while the rotor 106 has a mating surface 127, which mating surfaces are adjacent to each other and are continually in sealing engagement with each other. The periphery of the mating surfaces continually communicates with an annular passage 128 which leads to a return port 129, the fluid pressure of which is present at a low pressure seal 130 supported by the housing for frictional engagement with the input portion 118 of the rotor 106. Thus the relatively lower input torque is not materially resisted by the friction of the seal 130.

The rotor 106 comprises a control valve member which is movable angularly relatively to the spool 105 by an amount determined by the coaction of a pair of oppositely directed abutments 131, 131 which jointly define an aperture of the radial slot type between which stop means are provided, here comprising a pin 132.

The mating surfaces 126 and 127 are provided with porting holes, grooves, and plugs as described before. Thus the mating surface 126 is intersected by a pair of fluid inlet porting holes 133, 133, disposed oppositely from each other, and which are flanked by a pair of actuator ports 134, 135, which in turn are flanked by a pair of return porting holes 136, 136. The mating surface 126 is further provided with a pair of drain grooves 137, 138 for equalizing any leakage pressures. The angular distance between the inlet porting holes 133 and the adjacent actuator ports 134, 135 is relatively small, being somewhat less than 45°, so that the leakage path is quite short. As shown in FIGURE 7, each of the actuator ports 135 communicates by a bore 135a with the fluid passage 121, and each of the actuator ports 134 communicates by a bore 134a with the annular fluid passage 122. As best seen in FIGURE 6, each of the inlet porting holes 133 communicates by a bore 133a with the annular passage 108, and each of the return porting holes 136 communicates by a bore 136a with the annular return passage 128.

Coacting with the various porting holes and apertures in the spool or follow-up member 105 is the rotor member or control valve member 106 which includes means defining a groove 139 which opens into the sealing face 127, which is narrower than the diameter of the porting holes 133 and 136, and which is intersected and blocked by a number of hardened plugs 140 of uniform diameter received in rotor openings concentric with the porting holes 133 and 136. The ends of the plugs 140 are finished flush or coplanar with the sealing or mating surface 127, and are thus each wider than the width of the groove 139. In that the plug has a circular or round end which is substantially the same size as the porting holes 133 and 136, whenever the rotor is in a neutral position all such plugs are aligned with the corresponding mating holes to close the same. The term "corresponding" in the claims includes structure wherein the face of the plug is slightly larger than the associated porting hole to produce slight overlap, where its diameter is slightly smaller than the associated porting hole to produce a slight underlap and where it is identically the same size to produce zero-lap. During the fabrication, the holes which receive the plugs 140 are preferably made at the same time as their mating holes so that they initially are of identical size; then, if desired, one may be enlarged for underlap or overlap. Such a manufacturing process insures simultaneous concentricity of all of the porting holes with all of the plugs 140. The plugs 140 thus divide the circular groove 139 into a series of segments which can selectively communicate adjacent pairs of holes and porting holes which intersect the mating face 126. The porting holes 133 and 136 have axes which are disposed a uniform distance from the rotational axis, all of which axes lie parallel to each other. Thus the groove 139 extends in the direction of relative movability between the valve members 105, 106 and is intersected by the plugs 140, the center line of the groove 139 extending through the center line of the plugs 140 which are somewhat larger.

When the valve elements 105 and 106 are relatively displaced angularly, an edge of each of the plugs 140, opposite edges or walls of the groove 139, and an edge of one of the openings 133, 136 jointly define a virtually rectangular flow area, as described before. This particular structure is advantageous in that there is relatively low internal leakage, and the structure is self-compensating for wear at the mating surfaces 126, 127. The manufacture of this valve structure 103 includes the machining of the groove 139 in the valve member 106, and the forming of the circular port holes 133, 136 simultaneously with the plug-receiving holes in the valve member 106. Thereafter, with the elements disassembled, the hardened circular plugs 140 are installed, the valve element 105 is hardened if desired, and the ends of the plugs 140 are finished to be flush or coplanar with the mating surface 127.

Referring to FIGURES 10–14, there is shown a further valve structure generally indicated at 145 which comprises a servo valve illustrated in its neutral position. The valve structure 145 includes a stationary housing 146 which slidably supports a follow up valve member 147 which may be referred to as a spool, and an input or control valve member 148 which comprises a linear or straight rotor. If the housing 146 is omitted, as has been done in FIGURE 11, the valve elements 148 and 147 jointly comprise a four-way valve.

The spool 147 has a spool support 149 slidably supported by the housing 146 and the spool 147 slidably supports the straight rotor 148 which has an externally accessible portion or extension 150, also supported by the housing 146.

Where the spool support portion 149 is connected to a fluidly driven system under the control of the valve structure 145, the spool 147 comprises a follow up valve member, the same being an assembly of separate elements, but not a "spool" valve as is ordinarily known. The spool assembly 147 includes an upper plate 151 and a lower plate 152 extending parallel thereto, and secured in spaced relation thereto by a number of screws 153 which extend from one of the plate members 151 or 152 into the other thereof through a pair of spacers 154, 154. The connection between the upper and lower plates 151, 152 and the spacers is sealed by an elongated sealing strip 155 disposed at each corner of the resulting cavity, alignment pins 156 being included to the extent required. The spool assembly further includes a pair of end caps 157, 158 secured as by screws 159 to the upper and lower plates 151, 152 and apertured to slidably receive end portions of the slide-type rotor or control member 148. Each of the end caps 157 and 158 is provided with a sealing disk 160 to serve as a static seal, and an O-ring 161 to serve as a low pressure sliding dynamic seal which is retained by a retainer and bearing member 162. Suitable alignment pins 163 insure proper location of the end caps 157, 158. The members 162, 162 confront each other and either they and/or the adjacent surface of the seals 160, 160 may also serve as stop means for coaction with a pair of oppositely directed abutments 163, 163 on the rotor 148. The projection of the rotor 148 which extends through the end cap 157 is optional but is included preferably for maintaining fluid balance.

The spool 147, and in particular the upper plate 151 is provided with an inlet or inlet port 164 and a return or return port 165, while the lower plate 152 is provided with a pair of actuator openings 166, 167.

As best seen in FIGURES 12 and 13, the slide rotor 148 is of generally rectangular cross-section with each elongated corner thereof beveled to define fluid flow passages 168 extending therealong. These communicate with each other at both ends of the rotor 148 adjacent to the abutments 163.

The upper plate 151 has a mating surface 169 which confronts a mating surface 170 on the lower plate 152 in spaced relation, the amount of the spacing being determined by the spacers 154. The slide rotor 148 has a mating surface 171 and an oppositely directed mating surface 172 which respectively sealably slidably engage with the mating surfaces 169 and 170. The peripheries of these mating surfaces continually communicate with the passages 168 for returning any leakage to the return port 165. Thus the spacers 154 have oppositely directed surfaces which are coplanar with the mating surfaces 169 and 170, the thickness of the rotor 148 being slightly reduced to enable movement thereof even when the screws 153 are tight. The passages 168 could be defined by arcuate bevels to such an extent that the slide rotor would be substantially circular in cross-section, provided that antirotation means is associated therewith.

During manufacture, the rotor 148 and spool 147 are assembled as shown and a hole is formed by working through the inlet port 164 to provide a round porting hole or round opening 173 that extends through the upper plate of the spool 147, through the rotor 148 and into the lower plate 152 to comprise a blind port 174 opposite to the inlet porting hole 173, of the same size and concentric therewith. The hole thus formed in the rotor is of the same size and concentric therewith. A similar operation is performed at the return port 165 to provide a return porting hole 175 and a blind port 176 opposite thereto with a concentric hole of the same size through the rotor 148. The spool 147 is provided with a further return port 177 which may be closed as by a sealer plug 178, the interior of which communicates with the return port 165. By working through the added return port 177, a further return porting hole 179 is provided in the upper plate 151 concentric with and opposite to a blind port 180 of the same size connected by a hole in the rotor 148 of the same size. The holes thus formed in the rotor 148 are interconnected therein by a pair of oppositely directed grooves 181, 182 which have a width less than that of the porting holes 173–176, 178 and 180 and which open into the mating surfaces 171, 172 centered on such porting holes. Within each of the round holes in the rotor 148 which are aligned with the porting holes 173, 175, and 179, there is disposed a cylindrical hardened plug 183 of circular or round transverse configuration, the plug being tubular and thus comprising a sleeve, the ends of which are coplanar or flush with the mating surfaces 171, 172. The diameter of the plugs 183 is larger than the width of the grooves 181, 182 so that a plug 183 blocks each of the ends of the grooves 181, 182 and also divides the same by a third plug at the center, the axes of the plugs extending through the centers of the grooves 181, 182. Each plug is of uniform diameter and thus acts on the fluid openings 173, 174 to close the same when the rotor is in a neutral position. The plugs 183 are of substantially the same size as the associated openings or their opposite blind ports, the actual size being either identical, very slightly larger, or very slightly smaller than such openings to obtain respectively zero-lap, overlap, or underlap.

The actuator port 167 has an opening which communicates with one segment of the groove 181, while the actuator port 166 has an opening which communicates with the other section of the groove 181. The rotor 148 is provided with means which communicates corresponding increments of the grooves 181, 182, such means here comprising a hole which extends between each pair of groove increments and indicated at 184, 185. For ease of machining, the openings 184, 185 may be aligned with the actuator ports 166, 167, but such is not strictly necessary in this embodiment.

The inlet porting hole 173 is thus flanked by a pair of other openings 186, 187 which are flanked by a pair of return porting holes 175, 179. Each of the porting holes is aligned in a straight line which extends in the direction of the relative movement between the valve elements. Such is also the direction of the grooves 181, 182.

When the valve elements 148, 149 are relatively displaced, an edge of each plug 183, an edge of the adjacent opening 173, 175 or 179 and 174, 176, or 180, and opposite walls of the grooves 182, 181 define virtually rectangular flow areas lying in the planes of the mating surfaces 171, 172.

Either before or after the grooves 181 and 182 are machined, and with the rotor and spool elements assembled as a unit, the circular port holes 173, 175, and 179 are formed and extended through the rotor 148 into the lower plate 152 as shown. With the elements disassembled and hardened after machining, the circular tubular plugs 183 are rigidly inserted, as by a press fit, and their ends are thereafter finished to make them flush with the sealing faces 171, 172 of the rotor 148. If overlap or underlap is desired, the appropriate hole is enlarged prior to hardening. Concurrently with the finishing of the ends of the plugs 183, the thickness of the rotor 148 is accurately finished to provide the proper binding-free clearance so that tightening of the screws 153 leaves the rotor in slidable condition.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A rotary servo valve for a separate rotary fluid actuator having a shaft comprising in combination:
   (a) a stationary housing having fluid inlet and return ports;
   (b) a follow-up valve member rotatably supported in said housing and said member having means adapted to be drivably detachably coupled to the shaft of the actuator, said member having circular ports respectively connected by bores to said housing ports, and other ports respectively detachably connectable by other bores in said coupling means of said member with fluid passages in the actuator;
   (c) a control valve member rotatably supported in said housing concentrically with said follow-up member and having a sealing face in sealing relation to said follow-up member adjacent to said ports thereof, said control valve member having a portion accessible from outside said housing through which a control torque may be applied;
   (d) circular plugs disposed in said control valve member flush with said sealing face and concentric with said circular ports, and operative to effectively close them, and hence said valve, when said valve members are in a neutral position; and
   (e) groove-defining means in said sealing face of said control member and interconnecting adjacent pairs of said circular plugs, said groove means being operative to interconnect one of said circular ports with one of said other ports when said plugs are displaced from said circular ports.

2. A rotary servo valve for a separate rotary fluid actuator having a shaft comprising in combination:
   (a) a stationary housing having fluid inlet and return ports;
   (b) a follow-up valve member rotatably supported in said housing and said member having means adapted to be drivably detachably coupled to the shaft of the actuator, said member having circular ports respectively connected by bores to said housing ports, and other ports respectively detachably connectable by other bores in said coupling means of said member with fluid passages in the actuator, the axes of said circular ports being disposed a uniform distance from and extending parallel to the rotational axis of said follow-up member;
   (c) a control valve member rotatably supported in said housing concentrically with said follow-up member and having a sealing face in sealing relation to said follow-up member adjacent to said ports thereof, said control valve member having a portion accessible from outside said housing through which a control torque may be applied;
   (d) circular plugs disposed in said control valve member flush with said sealing face and concentric with said circular ports, and operative to effectively close them, and hence said valve, when said valve members are in a neutral position; and
   (e) groove-defining means in said sealing face of said control member and interconnecting adjacent pairs of said circular plugs, said groove means being operative to interconnect one of said circular ports with one of said other ports when said plugs are displaced from said circular ports.

3. A rotary servo valve for a separate rotary fluid actuator having a shaft comprising in combination:
   (a) a stationary housing having fluid inlet and return ports;
   (b) a follow-up valve member rotatably supported in said housing and having an axially extending extension adapted to be drivably detachably coupled to the shaft of the actuator, said member having circular ports respectively connected by bores to said housing ports, and other ports respectively detachably connected by other bores which converge into separate concentric passages in said extension of said valve member, said extension being also telescopically connectable fluidly with the actuator through its shaft;
   (c) a control valve member rotatably supported in said housing concentrically with said follow-up member and having a sealing face in sealing relation to said follow-up member adjacent to said ports thereof, said control valve member having a portion accessible from outside said housing through which a control torque may be applied;
   (d) circular plugs disposed in said control valve member flush with said sealing face and concentric with said circular ports, and operative to effectively close them, and hence said valve, when said valve members are in a neutral position; and
   (e) groove-defining means in said sealing face of said control member and interconnecting adjacent pairs of said circular plugs, said groove means being operative to interconnect one of said circular ports with one of said other ports when said plugs are displaced from said circular ports.

4. A rotary servo valve for a rotary fluid actuator having a shaft comprising in combination:
   (a) a stationary housing having fluid inlet and return ports;
   (b) a follow-up valve member rotatably supported in said housing and adapted to be drivably coupled to the shaft of the actuator, said member having circular ports respectively connected by bores to said housing ports, and other ports respectively connectable by other bores in said member with fluid passages in the actuator, said follow-up valve member having an annular peripheral piston surface communicating fluidly with said fluid inlet port for fluidly biasing said follow-up member in an axial direction;
   (c) a control valve member rotatably supported in said housing concentrically with said follow-up member and having a sealing face in sealing relation to said follow-up member adjacent to said ports thereof, said control valve member having a portion accessible from outside said housing through which a control torque may be applied;
   (d) a thrust bearing encircling said portion of said control member and operative between said housing and said control member to reactively oppose said fluid biasing of said follow-up member;
   (e) circular plugs disposed in said control valve member flush with said sealing face and concentric with said circular ports, and operative to effectively close them, and hence said valve, when said valve members are in a neutral position; and
   (f) groove-defining means in said sealing face of said control member and interconnecting adjacent pairs of said circular plugs, said groove means being operative to interconnect one of said circular ports with one of said other ports when said plugs are displaced from said circular ports.

5. A valve structure having a fluid inlet and return, including in combination:
   (a) a rotor having a pair of oppositely directed mating surfaces, said rotor being accessible for being moved;
   (b) a spool having a pair of confronting mating surfaces coacting with said mating surfaces of said rotor and having round porting holes intersecting said spool mating surfaces and communicating fluidly respectively with said fluid inlet and return, said spool being movable relatively to said rotor, and said round porting holes thereof being aligned in the direction of said relative movement and extending transversely thereto, said spool having an additional porting hole disposed between an adjacent pair of said round porting holes and communicating with an outlet;
(c) a pair of drainage grooves in one of said rotor and spool and extending adjacently to said porting holes;
(d) means defining an aperture in said rotor, the axis of said aperture lying transversely to the direction of said relative movement, and said aperture interconnecting said drainage grooves;
(e) a stop pin carried by said spool and loosely received in said aperture for limiting the amount of relative movement between said rotor and said spool;
(f) groove-defining means in said rotor opening into said mating surfaces at said porting holes; and
(g) a plurality of cylindrical plugs in said rotor each centered on said groove defining means and flush with said mating surfaces of said rotor and respectively sealing said round porting holes in said spool when said rotor and said spool are in a neutral position, and opening said round porting holes to define flow passages to the additional porting hole in response to relative displacement of said rotor and said spool from the neutral position.

6. A rotary servo valve for a rotary actuator comprising in combination:
(a) a stationary housing having a fluid inlet port and a fluid return port;
(b) a follow-up valve member rotatably supported in said housing and having an extension extending therefrom and adapted to be drivably coupled to the actuator, said member having circular ports respectively connected by bores to said housing ports, and an additional port communicating by a further bore in said member with a further port;
(c) a dynamic fluid seal between said housing and said follow-up member and sealing the pressure at said inlet port;
(d) a control valve member rotatably supported in said housing concentrically with said follow-up member and having a sealing face in sealing relation to said follow-up member adjacent to said circular ports thereof, said control valve member having an extension accessible from outside said housing through which a control torque may be applied;
(e) a dynamic fluid seal acting on said control member extension and sealing the pressure present at said return port;
(f) circular plugs disposed in said control valve member flush with said sealing face and concentric with said circular ports, and operative to effectively close them, and hence said valve, when said valve members are in a neutral position; and
(g) groove-defining means in said sealing face of said control member extending from said plugs to said additional port, and being conductive of fluid to and from said further port in response to movement of said members out of the neutral position.

7. A valve structure having a fluid inlet and return, including in combination:
(a) a rotor having a mating surface, and being accessible for being moved;
(b) a spool having a mating surface coacting with said mating surface of said rotor and having round porting holes intersecting said spool mating surface and communicating fluidly respectively with said fluid inlet and return, said spool being rotatable relatively to said rotor, and said round porting holes thereof being aligned in the direction of said relative movement and extending transversely thereto, said spool having an additional porting hole disposed between an adjacent pair of said round porting holes and communicating with an outlet, the axis of said additional porting hole being angularly spaced less than 45° from the axes of said adjacent round porting holes;
(c) groove-defining means in said rotor opening into said mating surface at said porting holes; and
(d) a plurality of cylindrical plugs in said rotor each centered on said groove defining means and flush with said mating surface of said rotor and respectively sealing said round porting holes in said spool when said rotor and said spool are in a neutral position, and opening said round porting holes to define flow passages to the additional porting hole in response to relative displacement of said rotor and said spool from the neutral position.

8. A valve having an inlet port and a return port, comprising in combination:
(a) a stationary housing;
(b) a spool having external surfaces slidably supported by said housing and having circular ports respectively connected by bores to said inlet and return ports, and an additional port communicating by a further bore in said spool with a further port, said spool having an extension accessible from outside said housing by which said spool may be moved with respect to said housing;
(c) a rotor movable relatively to said spool and having a sealing face disposed in slidable sealing relation to said spool adjacent to said circular ports thereof, said rotor having an extension to which a control force may be applied;
(d) a dynamic fluid seal acting on said rotor extension;
(e) means carried by said housing and supporting said dynamic seal;
(f) circular plugs disposed in said rotor flush with said sealing face and concentric with said circular ports, and operative to close them when said spool and said rotor are in a neutral position; and
(g) groove-defining means in said sealing face of said rotor, extending from said plugs to said additional port, and being conductive of fluid to and from said further port in response to relative movement of said rotor and said spool out of the neutral position.

9. A rotary servo valve for a separate rotary fluid actuator having a shaft comprising in combination:
(a) a stationary housing having fluid inlet and return ports;
(b) a follow-up valve member rotatably supported in said housing and said member having means adapted to be drivably detachably coupled to the shaft of the actuator, said member having circular ports having axes extending radially thereof and being respectively connected by bores to said housing ports, and other ports respectively detachably connectible by other bores in said coupling means of said member with fluid passages in the actuator;
(c) a control valve member rotatably supported in said housing concentrically with said follow-up member and having a tubular portion with a sealing face in encircling sealing relation to said follow-up member adjacent to said ports thereof, said control valve member having a portion accessible from outside said housing through which a control torque may be applied;
(d) circular plugs disposed in said tubular portion of said control valve member flush with said sealing face and concentric with said circular ports, and operative to effectively close them, and hence said valve, when said valve members are in a neutral position; and
(e) groove-defining means in said sealing face of said control member and interconnecting adjacent pairs of said circular plugs, said groove means being operative to interconnect one of said circular ports with one of said other ports when said plugs are displaced from said circular ports.

(References on following page)

References Cited by the Examiner

UNITED STATES PATENTS

| | | | |
|---|---|---|---|
| 620,282 | 2/99 | Cooper | 91—375 XR |
| 683,427 | 10/01 | Barger | 91—376 |
| 1,453,513 | 5/23 | Metz | 137—625.25 XR |
| 2,364,864 | 12/44 | Martin | 29—157.1 |
| 2,477,590 | 8/49 | Ferwerda et al. | 137—625.21 |
| 2,567,428 | 9/51 | Greeley | 137—625.21 |
| 2,705,829 | 4/55 | Mock | 29—157.1 |
| 2,875,782 | 3/59 | Lee | 137—625.27 |
| 2,892,450 | 6/59 | Hogan | 137—625.21 |
| 2,917,080 | 12/59 | Hatch | 137—625.65 |
| 2,986,165 | 5/61 | Hogan | 137—625.25 |
| 3,095,907 | 7/63 | Latham | 137—625.67 |

M. CARY NELSON, *Primary Examiner.*

MILTON KAUFMAN, LAVERNE D. GEIGER,
*Examiners.*